United States Patent [19]

Dugan

[11] Patent Number: 5,540,849
[45] Date of Patent: Jul. 30, 1996

[54] STACKED PLATE EDDY CURRENT-FILTER AND METHOD OF USE

[75] Inventor: Jeffrey S. Dugan, Asheville, N.C.

[73] Assignee: BASF Corporation, Mount Olive, N.J.

[21] Appl. No.: 383,187

[22] Filed: Feb. 3, 1995

[51] Int. Cl.⁶ .................................................. B01D 37/00
[52] U.S. Cl. .................... 210/767; 210/791; 210/787; 210/299; 210/512.1; 210/542; 210/322; 210/498; 210/488; 366/338; 95/272
[58] Field of Search ................................. 210/488, 299, 210/767, 300, 301, 511, 512.1, 542, 532.1, 791, 322, 498, 787; 95/267, 272; 209/210; 366/336, 338

[56] References Cited

U.S. PATENT DOCUMENTS

| | | |
|---|---|---|
| 3,397,794 | 8/1968 | Toth et al. ............................. 210/488 |
| 3,648,843 | 3/1972 | Pearson ................................. 210/488 |
| 3,827,568 | 8/1974 | Toth et al. ............................ 210/488 |
| 3,925,205 | 12/1975 | Sparham . |
| 4,156,644 | 5/1979 | Richard . |
| 4,267,045 | 5/1981 | Hoof ..................................... 210/488 |

*Primary Examiner*—Robert J. Popovics
*Attorney, Agent, or Firm*—Depaoli & Frenkel, P.C.

[57] ABSTRACT

A filter for filtering particulates from a particulate-containing fluid stream passing through the filter, contains one or more flow plates, each of the flow plates having (a) one or more primary fluid flow passages; and (b) one or more particulates-collecting, eddy current-forming accumulation chambers communicating with the primary fluid flow passages; wherein the accumulation chambers are not situated in the primary fluid flow passages and, when the accumulation chambers contain particulates, the particulate-containing accumulation chambers do not impede fluid flow through the primary fluid flow passages.

32 Claims, 2 Drawing Sheets

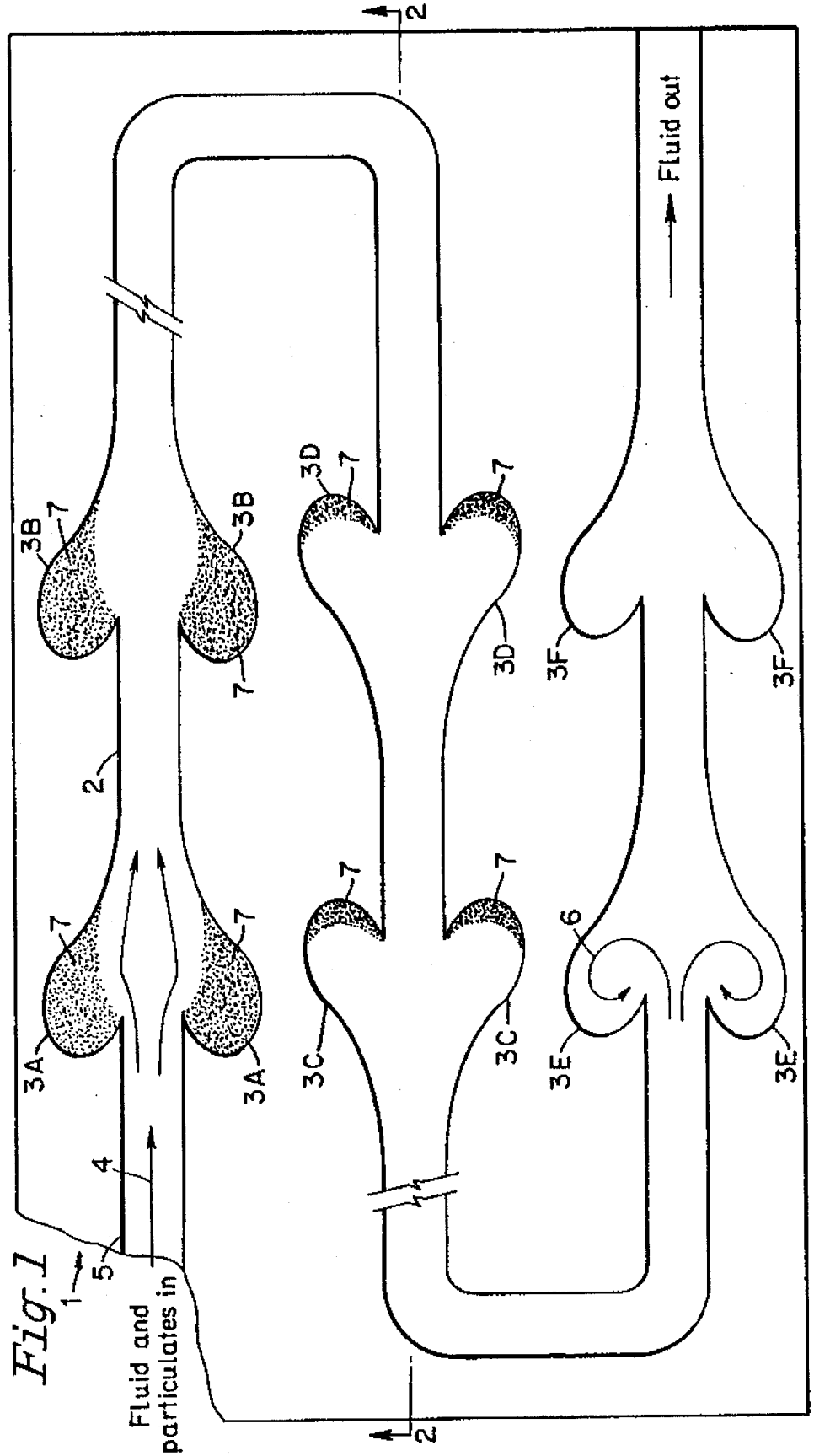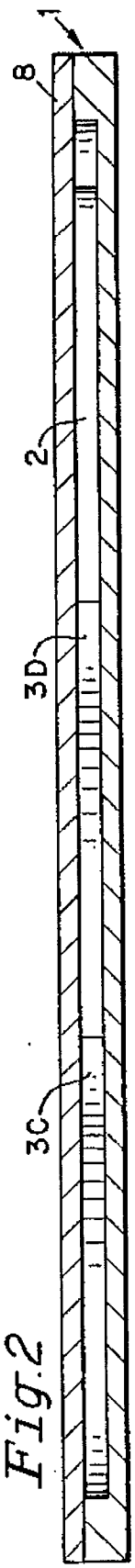

STACKED PLATE EDDY CURRENT-FILTER AND METHOD OF USE

BACKGROUND OF THE INVENTION

This invention relates to a filter and to a method of using the filter to remove particulates from a fluid stream. More particularly, this invention relates to a filter composed of one or more plates each having at least one specially configured primary fluid passage and at least one particulate-collecting chamber on the surface thereof, the particulate-collecting chamber being capable of generating eddy currents which remove particulates from the fluid stream passing through the filter.

Conventional filters for removing particulate matter from fluid streams have drawbacks. For example, conventional filters tend to be bulky, which makes them expensive to make and use and difficult to clean and re-use. Furthermore, in conventional filters, particulates are typically trapped in a web of fibers or other three-dimensional material having tiny pores. These pores eventually become clogged with the trapped particulates, leading to an increased pressure drop across the filter and eventual impedance or blockage of fluid flow through the filter.

It would be desirable, therefore, to provide a filter for removing particulates from fluid streams which does not operate to trap the particulates in a web or other material having tiny pores.

Alternative filters are known in the art for separating particulates from fluid streams. For example, filters capable of producing eddy currents to separate particulate matter from fluid streams are known. Reference is made, for example, to U.S. Pat. Nos. 4,156,644 (to Richard) and 3,925,205 (to Sparham). The filter disclosed in the Richard patent is a sludge bed in which preferential currents are formed. These currents promote agglomeration of the sludge while allowing contaminated liquid to flow upwardly through the sludge bed at a relatively high rate. The preferential currents are formed in the sludge bed by a flow control system, which can be composed of inclined, corrugated metal plates. Baffles on these plates produce eddy effects in the preferential currents. Sparham discloses a method of separating solids suspended in a liquid, wherein the liquid is passed through a labyrinth of eddy-forming surfaces in series with a sheet perforate member. The labyrinth may be composed of metallic plate-like members having eddy-forming surfaces. The eddy-forming surfaces may be in the form of ribbed walls or an undulating cross-section. The liquid passes through passages (which follow a zig-zag or non-linear path) formed between the plate-like members.

In the filters disclosed in the Richard and Sparham patents, the particulate-collecting regions are situated in the primary or main flow path of the fluid stream passing through the filters. As a result, particulates filtered from the fluid stream accumulate in the primary flow path and eventually impede or block fluid flow through the path. Thus, like the conventional filters discussed previously herein, the Richard and Sparham filters also experience flow blockage. Therefore, it would be desirable to provide a filter for removing particulates from a fluid stream wherein the particulate-collecting region of the filter is not situated in the primary flow path, and the accumulation of particulates in these regions does not operate to impede or block the flow of the fluid through the filter.

A primary object of this invention is to provide a filter having one or more particulate-collecting chambers, wherein the particulate-collecting chamber(s) is not situated in the primary flow path of the primary fluid flow passage and particulate accumulation into these particulate-collecting chamber(s) does not impede or block fluid flow through the filter or increase pressure drop across the filter.

Another object of this invention is to provide a filter for removing particulates from a fluid stream, wherein the filter is relatively easy and inexpensive to manufacture, clean, inspect, re-use, dispose of, and replace.

An additional object of this invention is to provide a method of removing particulates from a fluid stream comprising the use of a filter having the characteristics set forth in the preceding objects.

These and other objects which are achieved according to the present invention can be readily discerned from the following description.

SUMMARY OF THE INVENTION

The present invention provides a filter for filtering particulates from a particulate-containing fluid stream passing through the filter, the filter containing one or more flow plates, each of the flow plates having (a) one or more primary fluid flow passages, each of the one or more primary fluid flow passages having an inlet and an outlet; and (b) one or more particulates-collecting, eddy current-forming accumulation chambers, each of the accumulation chambers having a particulate-receiving opening, wherein the particulate-receiving opening is disposed in fluid communication with a longitudinal side portion of the one or more primary fluid flow passages, said opening facing a downstream region of the one or more primary fluid flow passages, the downstream region being disposed downstream relative to the longitudinal side portion; each of the one or more accumulation chambers extending away from the longitudinal side portion in a direction which is backward and upstream relative to the longitudinal side portion; the one or more accumulation chambers being disposed to induce formation therein of eddy currents from the fluid stream as the stream passes through the one or more primary fluid flow passages from the inlet to the outlet, the eddy currents causing at least a portion of the particulates in the stream to leave the stream and accumulate in the one or more accumulation chambers; wherein the one or more accumulation chambers are not situated in the one or more primary fluid flow passages and, when the one or more accumulation chambers contain particulates, the one or more particulate-containing accumulation chambers do not impede fluid flow through the one or more primary fluid flow passages.

The present invention also provides a method of filtering particulates from a particulate-containing fluid stream which involves passing the fluid stream through the primary fluid flow passage(s) of the filter.

The filter of this invention can also be used to transfer particulates from a first fluid stream to a second fluid stream. This involves passing the first fluid stream through the primary fluid flow passage(s) and then passing the second fluid stream through the primary fluid flow passage(s) in a direction opposite to that followed by said first stream. At least a portion of the particulates accumulated in the accumulation chamber(s) during the first fluid stream's passage through the primary fluid flow passage(s) leaves the accumulation chamber(s) and enters the second fluid stream as the second stream passes through the primary fluid flow passage(s) in the opposite direction.

The use of the filter of this invention to remove particulates from a fluid stream results in little or no blockage of the fluid flow as the particulates become trapped in the filter. As stated previously herein, conventional filters typically trap particulates in a web of fibers or other three-dimensional material having tiny pores, leading to eventual blockage of the pores as the particulates are trapped therein. Because the entrapment means in the conventional filters is situated in the direct path of the flow of the fluid to be filtered, the blocked pores cause an increase in the pressure drop across the filter and impede the flow of the fluid through the filter. In contrast, in the filter of the present invention, the entrapment means, i.e., the particulate-collecting accumulation chambers, are not located in the primary flow path(s) of the primary fluid flow passage. In the present invention, the accumulation chambers become closed off as they fill with particulates but do not impede or block fluid flow through the primary fluid flow passage. The closing off of the eddy current-forming accumulation chambers actually reduces eddy currents formed in the accumulation chambers and primary fluid flow passage. As turbulence is reduced, fluid flows more efficiently through the primary fluid flow passage and the pressure drop across the filter actually decreases rather than increases. Thus, trapped particulates do not cause the fluid flow through the filter of this invention to become blocked or impeded.

In one embodiment of the filter of this invention, the filter contains thin (e.g., 0.001–0.25 inch thick) metal flow plates. These thin plate filters are easier and less expensive to make, clean, inspect, re-use, dispose of and replace than are filters made of non-linear or baffled thicker flow plates such as described in the previously mentioned patents to Richard and Sparham. Such thick metal, eddy current-forming plates are generally expensive to form, requiring die casting, shaping, cutting and/or welding processes, which add to the expense of the filter. Furthermore, because of the presence therein of flow passages having small sizes relative to the size of the metal plates, cleaning and inspection processes for the thick plates are generally more time-consuming and expensive than for thin plates. The higher initial cost of the thick metal plates themselves, as well as the expense involved in accurately machining or otherwise shaping them, generally precludes discarding or disposing the thick plates as an alternative to cleaning. However, disposal and replacement of the filter may be required if the filter becomes corroded by the fluid or contaminants flowing therethrough, e.g., water. Because they are easier and less expensive to manufacture and machine, thin plate filters are also less expensive to dispose of and replace.

In other embodiments, the filter of this invention further contains a plurality of flow plates stacked in horizontal or vertical configurations. In horizontal configurations, the plates may be stacked, for example, in side-to-side or end-to-end fashion. In vertical configurations, the plates may be stacked, for example, front to front or front-to-back. Preferably, the filter of this invention will further contain a cover plate, preferably a removable cover plate. In a vertical stack of flow plates, a cover plate may be disposed on the top plate or between the individual flow plates. Alternatively, the top plate may contain a cover plate thereon and the remaining plates may serve as cover plates for the plates directly underneath. In a horizontal stack of flow plates, a cover plate may be placed on each flow plate, or a manifold may be situated to enclose and prevent leakage from the inlet of the first flow plate in the horizontal stack and to enclose and prevent leakage from the outlet of the last flow plate in the stack. When a cover plate is used, the cover plate is disposed on the flow plate surface containing the primary fluid flow passage(s) and accumulation chamber(s). When cleaning a filter containing a flow plate and a cover plate, the flow plate can simply be removed from the cover plate and the particulates removed from the accumulation chamber(s), thereby leaving a clean flow plate to be re-used, if desired.

BRIEF DESCRIPTION OF THE DRAWINGS

FIG. 1 is a plan view of one embodiment of a flow plate used in the filter of this invention.

FIG. 2 is a cross-sectional view of an embodiment of a filter of this invention containing the flow plate illustrated in FIG. 1 and a cover plate thereon.

DETAILED DESCRIPTION OF THE INVENTION

The filter of this invention is made up of one or more flow plates, preferably one or more thin flow plates, each containing one or more primary fluid flow passages and one or more particulates-collecting, eddy current-forming accumulation chambers. The primary fluid flow passage(s) and the accumulation chamber(s) are mutually aligned in direct fluid communication. However, the accumulation chamber(s) is not situated in the primary fluid flow passage(s), and, when the accumulation chamber(s) contains particulates, the particulate-containing accumulation chamber(s) does not impede fluid flow through the primary fluid flow passage(s).

The accumulation chamber(s) induces the formation of eddy currents therein from the passing fluid stream. The eddy currents cause at least a portion of the particulates in the particulate-containing fluid stream to leave the fluid stream and accumulate in one or more of the accumulation chamber(s).

The term "primary fluid flow passage" as used herein refers to the passage which carries the main flow of a fluid stream passing through the filter.

In one embodiment of the filter of this invention, the accumulation chamber(s) is formed in one or more longitudinal sides of the primary fluid flow passage(s). This embodiment can be seen, for example, in FIGS. 1 and 3 herein. In this embodiment, the accumulation chambers need not, but may, all be situated on one longitudinal side of the primary fluid flow passage or one or more chambers can be situated on a first longitudinal side and one or more chambers can be situated on a second longitudinal side of the passage(s). The chambers can exist as pairs, wherein the chambers in a pair are situated directly opposite from each other across a transverse section of the primary fluid flow passage(s). This is illustrated, for example, in FIG. 1, which is discussed in greater detail below. The chambers may also exist as pairs, with each chamber in a pair being on the same or opposite longitudinal sides. The chambers may be situated directly across from each other (see, e.g., FIG. 1), or on opposite longitudinal sides or not directly across from each other (see, e.g., FIG. 3).

Regardless of the longitudinal side on which the chambers may be situated, each chamber in each flow plate is in direct fluid contact with the primary fluid passage but is not situated within a primary flow path within the primary fluid passage.

In another embodiment of the filter of this invention, the primary fluid flow passage(s) is divided by a dividing means having a downstream end and an upstream end, with the accumulation chamber(s) being formed in the downstream end of the dividing means. An example of this embodiment can be seen in FIG. 4 herein. In another embodiment, the primary fluid flow passage(s) is divided in lengthwise fashion by a plurality of spaced dividing means, each containing an accumulation chamber in the downstream end.

Figure 4:
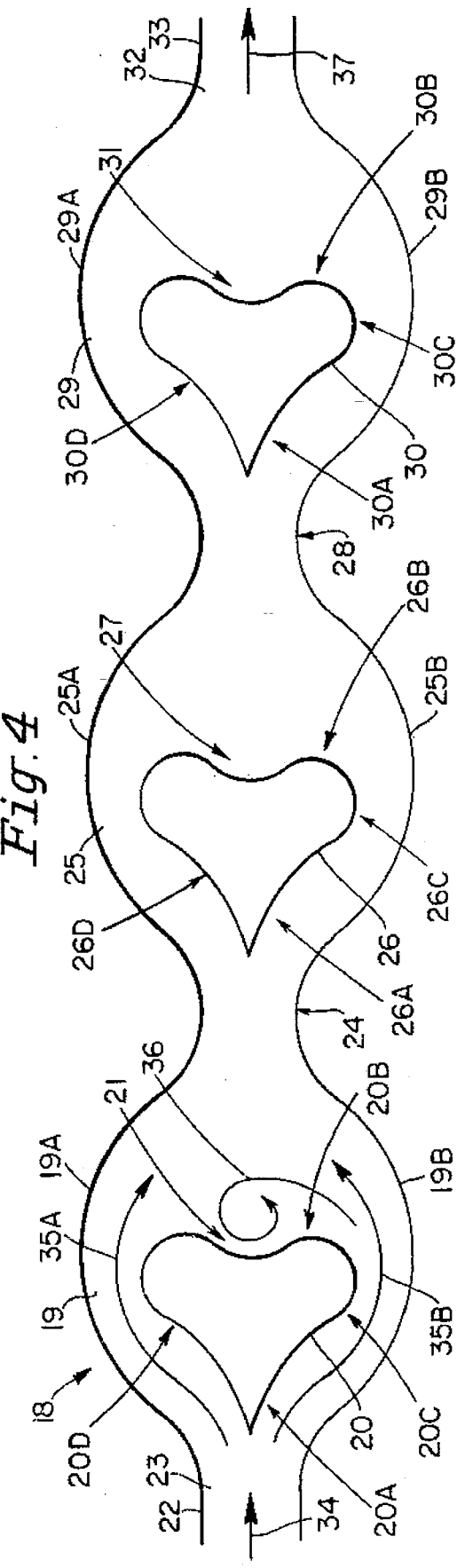
FIG. 4 is a plan view of an embodiment of a primary fluid flow passage which can be used in the filter of this invention.

The dividing means is shaped so as to reduce eddy currents along the sides of the dividing means and to induce eddy currents at the downstream end of the dividing means. The dividing means includes any structure which can divide or split a stream into two or more substreams, for example, as shown in FIG. 4 herein, and reduce the eddy currents along the sides of the dividing means and induce eddy currents at the downstream end of the dividing means. Examples of dividing means include physical splitters such as, e.g., physical barriers, baffles and the like. The dividing means can be of any desired shape and size as long as the dividing means achieves the purpose described hereinabove.

The specific number of accumulation chambers will depend on the nature of the fluid and particulates in the fluid stream and also on the width, depth and length of the primary fluid flow passage. As few as one chamber to as numerous as several dozen or even several thousand chambers can be used.

The filter of this invention may contain a single flow plate or a plurality of flow plates. Descriptions given herein of a single flow plate used in the filter of this invention are equally applicable to all the flow plates which can be used in the filter. When a plurality of flow plates are used, the plates can be stacked in a variety of configurations, including horizontal or vertical configurations. In horizontal configurations, the flow plates may be stacked end-to-end or side-to-side, while in vertical configurations, the plates may be stacked front-to-back or front-to-front, wherein "front" refers to the primary fluid flow passage/accumulation chamber-containing surface and "back" refers to the flat surface, i.e., the surface which does not contain the passage or chambers.

The plates or the primary fluid flow passage(s) in one or more plates may also be arranged to achieve particular objectives, including, for example, the simultaneous filtration of two or more fluid streams, the successive filtration of a single fluid stream, an increased flow rate through the filter without having to increase the size of the channels therein, and/or the enclosure of the primary fluid passage and chambers to allow leak-proof flow.

To achieve one or more of these objectives, a single flow plate can be provided with a plurality of separate and parallel primary fluid flow passages or with a primary fluid flow passage divided by one or more of the previously-described dividing means into a plurality of separate and parallel subpassages. One or more of the aforementioned objectives can also be achieved by means of a plurality of flow plates arranged in parallel or in series fashion.

In a single flow plate containing a plurality of separate and parallel primary fluid flow passages or a primary fluid flow passage divided by one or more of the previously-described dividing means into a plurality of separate and parallel subpassages, separate substreams from a common stream source can undergo simultaneous filtration by simultaneously passing each stream through a separate primary fluid flow passage or through a separate subpassage.

In a single flow plate containing a plurality of separate and parallel primary fluid flow passages, a plurality of fluid streams (each from a different source) can undergo simultaneous filtration by simultaneously passing each stream through a separate primary fluid flow passage.

In parallel stacked plate configurations, the plates may be stacked front-to-back or side-to-side. Parallel configurations allow a plurality of fluid streams, e.g., separate substreams from a common stream source, to be simultaneously filtered. Each flow plate in a parallel-configured stack of plates functions as an independent filter. Each fluid stream in a plurality of fluid streams is passed through an individual flow plate in a parallel-configured stack of flow plates such that all the streams undergo filtration at the same time. One advantage offered by parallel configurations is that filtration time for a given fluid stream can be reduced by dividing the main fluid stream into substreams and then simultaneously filtering each substream by passing each substream through a flow plate in a particular parallel stack configuration at the same time.

In series configurations, the flow plates can be stacked, for example, end-to-end or front-to-back. Series configurations allow a single fluid stream to undergo successive filtrations in a single stack of flow plates. In an end-to-end configuration of flow plates, the primary fluid flow passage in each flow plate is in fluid communication with the primary fluid flow passage in a preceding and succeeding flow plate. In a front-to-back configuration, each flow plate is in fluid communication with the flow plates immediately above it and immediately below it. This fluid communication can be achieved, for example, by means of through-holes in the respective plates or by means of a common manifold in fluid communication with each plate such that a fluid stream exiting a flow plate travels to the plate above or the plate below via the common manifold.

An increase in flow rate without a corresponding increase in the depth of the fluid flow passage can be achieved, for example, by using flow plates stacked in a front-to-front configuration. In each flow plate in a pair of flow plates in a front-to-front relationship, the passage depth will be increased by an amount equal to the passage depth of the other flow plate.

A cover plate can be used in both horizontal stack and vertical stack configurations. For example, in a horizontal stack configuration, a cover plate may be disposed on the front face of one or more, preferably on the front face of all, of the flow plates in either the end-to-end or side-to-side stacked arrangement. More preferably, an inlet manifold encompassing the inlet and an outlet manifold encompassing the outlet of end-to-end or side-to-side stacked plate filters are also used to control flow leakage from such horizontal stacks. In front-to-back vertical stack configurations, separate cover plates may not be needed since the back face of a flow plate can act as a cover plate for the front face of the plate immediately below. In front-to-front vertical stack configurations, a cover plate between the individual flow plates can be used. However, if it is desired to increase flow rate by increasing passage depth, a cover plate between the individual flow plates is generally not used.

Figure 3:
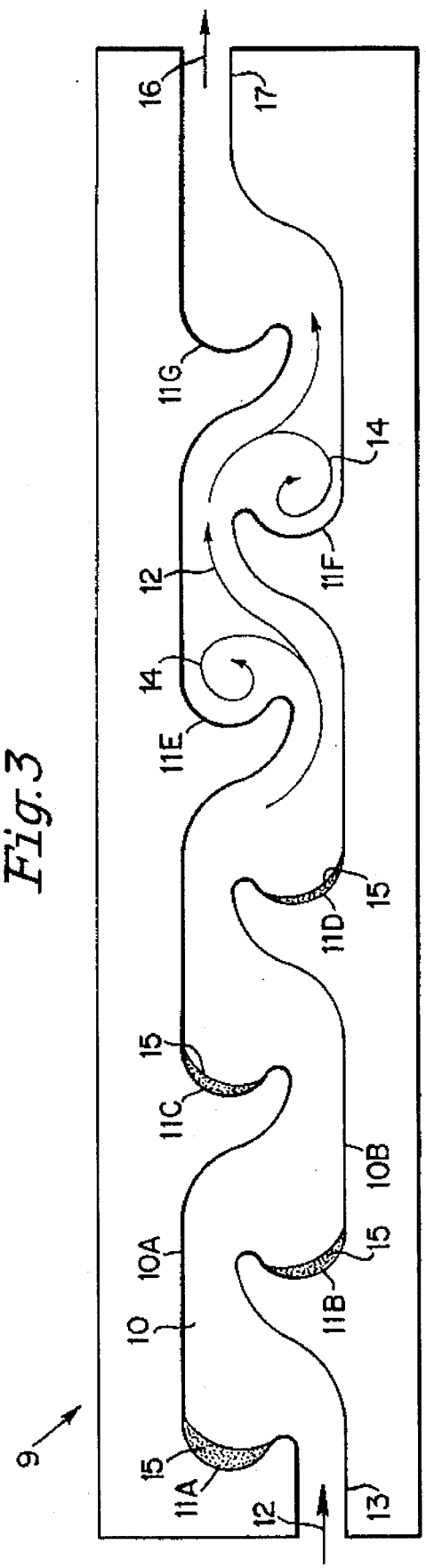
FIG. 3 is a plan view of a second embodiment of a flow plate used in the filter of this invention.

The primary fluid flow passage(s) preferably extends across the flow plate(s), more preferably from an inlet of the flow plate(s) to an outlet thereof. Generally, the primary fluid flow passage(s) will have a linear or non-linear pattern, preferably non-linear. An example of one suitable non-linear flow pattern is a zig-zag pattern as illustrated in FIG. 1, described in greater detail hereinbelow. An example of another suitable non-linear flow pattern is an S-shaped flow pattern as shown in FIG. 3, also described in greater detail hereinbelow. The depth and width of the primary fluid flow passage(s) and accumulation chamber(s) in a particular flow plate depends at least in part on the thickness of the flow plate. For example, a primary fluid flow passage and/or accumulation chamber depth of from about 20% to about 80% of the thickness of the flow plate is suitable. The dimensions of the fluid flow passage(s) and the accumulation chamber(s) should be selected to avoid excessive pressure drops to prevent leaks or damage to the filter.

The depth and width of a primary fluid flow passage and an accumulation chamber in a flow plate will also depend in part on the size of the particulates in the fluid stream passing through the filter. Typically, the larger the particulates, the deeper and/or wider the passage and chamber should be to accommodate the particulates. If a relatively deeper or wider passage and chamber is not desired, an alternative means to accommodate larger particulates is to stack two identically recessed flow plates together face-to-face, wherein the corresponding fluid flow passages and chambers are in a mirror image to one another, so that the original passage and chamber depths are doubled.

Each flow plate used in the filter of this invention may have a thickness of at least about 0.001 inch, preferably from about 0.001 inch to about 1.0 inch, more preferably from about 0.001 inch to about 0.25 inch, and most preferably from about 0.01 inch to about 0.10 inch.

The flow plate may be metallic or nonmetallic. Non-limiting examples of suitable metals for use in the flow plate include, for example, stainless steel, aluminum, aluminum-based alloys, nickel, iron, copper, copper-based alloys, mild steel, brass, titanium and other micromachinable metals. Suitable non-metallic materials for use in the flow plate include, for example, plastics, e.g., thermoplastic engineering resins, such as Lexan® polycarbonate, available from General Electric Company; glass; resin-bonded fibrous materials; linoleum; wood; and ceramics.

Preferably, the flow plate is composed of a material which is inert to the fluid stream passing through the passages and channels of the flow plate. Because of its inertness and the relatively low cost associated with its use, stainless steel is a particularly useful in the filter of this invention.

A micromachining process is preferably used to form the primary fluid flow passage(s) and accumulation chamber(s) in the flow plate(s). Non-limiting examples of suitable micromachining processes include etching, stamping, punching, pressing, cutting, molding, milling, lithographing, particle blasting, or combinations thereof. Preferably, the primary fluid flow passage(s) and accumulation chamber(s) are formed by etching. Etching, e.g., photochemical etching, provides a precisely formed primary fluid flow passage and accumulation chamber while being less expensive than many other conventional machining processes, such as, for example, drilling, milling and reaming. Furthermore, etched perforations generally do not have the sharp corners, burrs, and sheet distortions associated with mechanical perforations. Etching processes are well known in the art. Typically, etching is carried out by contacting a surface with a conventional etchant.

As stated previously herein, in one embodiment, the filter of this invention contains a plurality of flow plates stacked in configurations to enclose the primary fluid flow passage(s) and accumulation chamber(s) in each flow plate. Alternatively, the plurality of flow plates may be stacked end-to-end. In each of these embodiments, a removable cover plate can be used on the individual flow plates to enclose the passages and chambers. The purpose of the cover plate is to confine the flow of the fluid stream within the filter. Thus, the cover plate is generally situated on the surface of the flow plate containing the primary fluid flow passage(s) and the chamber(s). The cover plate is preferably removable from the flow plate.

The cover plate can be composed of any suitable material which allows it to fulfil its purpose stated above, i.e., to confine the flow of the fluid stream within the filter. For example, the cover plate can be made of the same metal or non-metal present in the flow plate. Preferably, however, the cover plate is made of a transparent material such as glass or plastic (e.g., Lexan (Registered Trademark) polycarbonate available from General Electric Company), to allow direct visual observation of the accumulation chamber(s) and the primary fluid flow passage(s) to determine the sufficiency of the filtration. Otherwise, the fluid stream exiting the outlet of the filter may be analyzed to determine the particulate content still present in the filtered fluid stream. The dimensions of the cover plate can be the same as or different from those of the flow plate on which the cover plate is disposed. For example, the cover plate can be thicker than the flow plate.

When the filter of this invention is composed of a plurality of flow plates, the plates are preferably joined to one another to form a rigid structure. The plates may be removably held together and made leakproof by means of pressure, bolts, rivets, clamps and the like; or the plates may be laminated, bonded, glued, soldered, or brazed together to form a composite. Preferably, the individual plates are removably attached to one another to facilitate cleaning, inspection and re-use of the plates.

Alternatively, if desired, the back of one flow plate may serve as a cover plate for another flow plate directly beneath it, in which case a separate cover plate is needed only for the top flow plate in a stack.

The filter of this invention can be made, for example, by providing a first flat metallic plate, which is preferably thin, and micromachining, preferably photochemically etching, the blank to produce at least one primary fluid flow passage and one or more accumulation chambers. The micromachined sheet containing the primary fluid flow passage(s) and the accumulation chamber(s) is referred to herein as the "flow plate". When a cover plate is to be used, a second thin, flat and preferably metallic blank can be placed on the first blank on the surface containing the primary fluid flow passage(s) and accumulation chamber(s).

The present invention is further directed to a method of filtering particulates from a particulate-containing fluid stream. This method involves the steps of:

(1) providing a filter containing one or more flow plates, each of the one or more flow plates having (a) one or more primary fluid flow passages, each of the one or more primary fluid flow passages having an inlet and an outlet; and (b) one or more particulates-collecting, eddy current-forming accumulation chambers, each of the accumulation chambers having a particulate-receiving opening, wherein the particulate-receiving opening is disposed in fluid communication with a longitudinal side portion of the one or more primary fluid flow passages, the opening facing a downstream region of the one or more primary fluid flow passages, the downstream region being disposed downstream relative to the longitudinal side portion; each of the one or more accumulation chambers extending away from the longitudinal side portion in a direction which is backward and upstream relative to the longitudinal side portion; the one or more accumulation chambers being disposed to induce formation therein of eddy currents from the fluid stream as the stream passes through the one or more primary fluid flow passages from the inlet to the outlet, the eddy currents causing at least a portion of the particulates in said stream to leave the stream and accumulate in the one or more accumulation chambers; wherein the one or more accumulation chambers are not situated in the one or more primary fluid flow passages and, when the one or more accumulation chambers contain particulates, the one or more particulate-containing accumulation chambers do not impede fluid flow through the one or more primary fluid flow passages; and (2) passing the fluid stream through the one or more primary fluid flow passages from the inlet to the outlet such that the eddy currents are formed in the one or more accumulation chambers, thereby causing the portion of the particulates in the fluid stream to leave the fluid stream and to pass through the particulate-receiving opening to enter and accumulate in one or more of the one or more accumulation chambers.

Typically, the eddy currents include a reverse flow or backflow element. In other words, as a fluid stream passes through the primary fluid flow passage(s), eddy currents are formed in the accumulation chamber(s), wherein the eddy currents usually move in a backwardly direction, e.g., backwardly clockwise or backwardly counterclockwise, from the passing fluid.

The filter and method of this invention can be applied to a wide variety of fluids and particulates.

The term "fluid" as used herein includes liquids, gases, and liquid/gas combinations. Examples of liquids which can be filtered include water, oil, heating fluids, and coolant fluids. Examples of suitable gases include steam, air and combustion gases, e.g. oxygen. The filter and method of this invention are particularly useful in treating liquids. Liquids treated by the filter of this invention preferably have a viscosity low enough to allow the liquid to flow through the primary fluid flow passage without clumping. If the liquid has a high viscosity and tends to form clumps or globs in the passage or tends to retain particulates and resist filtration, e.g., some types of viscous polymer fluids, certain parameters, e.g., flow rate, can be adjusted to improve the deposition of particulates in the chambers.

The filter and method of this invention can be used to remove any type of particulate, i.e., any type of solid material. Typically, the particulates are organic or inorganic impurities. Non-limiting examples of particulates include reagents such as coagulating agents, flocculating agents, activated carbon and the like; sludge; dirt; ash; colloidal or gelatinous solids such as those found in sewage; and, in general, particulates found in wastewaters, e.g., wastewaters emerging from any industrial processing or mining operations.

The filter and method of this invention are effective for filtering fluid streams having a widely varying particulate concentration in the fluid stream. The specific particulate concentration will generally depend on the source of the specific fluid being treated. The flow rate of the fluid stream as it passes through the filter of this invention can be varied according to the fluid viscosity, particulates concentration in the fluid being treated, degree of filtration required, number of accumulation chambers present in the flow plates, number of flow plates, and any other feature which influences the quality of filtration of the fluid passing through the primary flow path(s).

When free of particulates, the accumulation chamber(s) induces eddy currents to form in the accumulation chamber(s) and, to a lesser extent, at the interface of the chamber(s) and the primary fluid flow passage(s). The slower velocity and circular motion of the eddy currents in the chamber(s) cause particulates in the fluid stream to settle out and accumulate therein. When the chamber(s) become full of particulates, the flow plate(s) can be removed from the filter or the cover plate, and the particulates washed, dissolved, burned out or otherwise removed, thereby leaving a clean reusable flow plate.

An alternative method of cleaning the flow plate involves passing the particulate-containing first fluid stream through the primary fluid flow passage(s) in a first direction, and then passing a second fluid stream in a second direction through the primary fluid flow passage(s), the second direction being reverse or opposite to the first direction, which was that direction followed by the particulates-containing first fluid stream. The reverse-flowing second fluid picks up particulates from one or more particulate-containing accumulation chambers and carries the particulates away, leaving a clean and reusable flow plate.

Flowing a second fluid in a reverse direction through the primary fluid flow passage(s) as described above can also be carried out if it is desired to transfer particulates from a first fluid to a second fluid. The second fluid collects particulates left behind by the first fluid as the first fluid passed through the primary fluid flow passage(s).

Thus, a further embodiment of this invention is directed to a method of transferring particulates from a first fluid stream containing the particulates to a second fluid stream, involving the steps of:

(i) providing the filter of this invention as previously described herein;

(ii) passing the first fluid stream through the one or more primary fluid flow passages from the inlet to the outlet such that the eddy currents are formed in the one or more accumulations chambers, thereby causing the portion of the particulates in the particulate-containing first fluid stream to leave the first fluid stream and pass through the particulate-receiving opening to enter and accumulate in one or more of the one or more accumulation chambers; and (iii) after step (ii), passing the second fluid through the one or more primary fluid flow passages from the outlet to the inlet, wherein at least a portion of the particulates accumulated in the one or more accumulation chambers travels from the one or more accumulation chambers to the second fluid stream.

The present invention will now be further described by reference to FIGS. 1–4.

In FIG. 1, a thin flow plate 1 is provided, containing a zig-zag primary fluid flow passage 2 and six pairs of accumulation chambers 3A–3F formed on longitudinal sides of the passage 2 are illustrated. Each accumulation chamber is in direct contact with passage 2 but none are situated within the passage. The accumulation chambers in each pair are situated directly across (transversely) from each other on opposite longitudinal sides of the passage 2. A particulate-containing fluid stream 4 can be introduced into flow plate 1 and passage 2 via inlet 5. As the fluid stream passes through passage 2, eddy currents 6 are formed in the accumulation chambers. These eddy currents cause particulates 7 in the passing fluid stream 4 to leave the fluid stream and settle into one or more accumulation chambers, e.g., accumulation chamber pairs 3A–3D. The accumulation chamber pairs become closed off as they fill with particulates 7, but do not impede or block the flow of the fluid stream 4 through the primary fluid flow passage 2. The closing off of the eddy current-forming accumulation chamber pairs 3A and 3B reduces eddy currents 6 formed in these accumulation chambers and in turn reduces turbulence caused by such eddy currents. As turbulence is reduced, the fluid stream 4 flows more efficiently through the primary fluid flow passage 2 and the pressure drop across the filter actually decreases rather than increases. Thus, trapped particulates do not cause the fluid flow through the filter of this invention to become blocked or impeded.

FIG. 2 shows a cross-sectional view of the filter presented in FIG. 1, wherein the filter further contains a cover plate 8 disposed on the flow plate 1.

In FIG. 3, a thin flow plate 9 is illustrated, which contains an S-shaped primary fluid flow passage 10, a first longitudinal side 10A and a second longitudinal side 10B, and seven accumulation chambers 11A–11F in direct contact with passage 10. Accumulation chambers 11A, 11C, 11E and 11G are formed in longitudinal side 10A while accumulation chambers 11B, 11D and 11F are formed in longitudinal side 10B. None of the accumulation chambers is situated within passage 10. A particulate-containing fluid stream 12 can be introduced into flow plate 9 and passage 10 via inlet 13. As the fluid stream passes through passage 10, eddy currents 14 are formed in the accumulation chambers. These eddy currents cause particulates 15 in the passing fluid stream 12 to leave the fluid stream and settle into one or more accumulation chambers, e.g., accumulation chambers 11A–11G. The accumulation chambers become closed off as they fill with particulates 15, but do not impede or block the flow of the fluid stream 12 through the primary fluid flow passage 10. The closing off of the eddy current-forming accumulation chambers 11A–11D reduces eddy currents 14 formed in these accumulation chambers and in turn reduces turbulence caused by such eddy currents. As turbulence is reduced, the fluid stream 12 flows more efficiently through the primary fluid flow passage 10 and the pressure drop across the filter actually decreases rather than increases. Thus, trapped particulates do not cause the fluid flow through the filter of this invention to become blocked or impeded. The filtered fluid stream 16 can then leave flow plate 9 via outlet 17

In FIG. 4, a primary fluid flow passage 18 is shown, which is composed of divided primary fluid flow subpassages pairs 19, 25 and 29 situated between an inlet port 22 and an outlet port 33. Dividing means 20, 26 and 30 situated in primary fluid flow passage be divide passage be into primary fluid flow subpassage pairs 19, 25 and 29. In passage be, passage section 23 is divided by dividing means 20 to form subpassages 19A and 19B, which unite to form passage section 24. Passage section 24 is divided by dividing means 26 to form subpassages 25A and 25B, which unite to form passage section 28. Passage section 28 is divided by dividing means 30 to form subpassages 29A and which recombine to form passage section 32. Passage section 32 leads to outlet port 33. Dividing means 20, 26 and 30 each have an upstream end, 20A, 26A and 30A, respectively; and a downstream end 20B, 26B and 30B, respectively. Accumulation chambers 21, and 31 are formed in the downstream ends 20B, 26B and 30B of dividing means 20, 26 and 30, respectively. In these locations, the accumulation chambers are not in the direct flow path of subpassages 19A, 19B, 25A, 25B, 29A and 29B and passage sections 24, 28 and 32.

In FIG. 4, dividing means 20, 26 and 30 are each shaped so as to reduce eddy currents along the sides, i.e., 20C, 20D, 26C, 26D, 30C and 30D, of the dividing means, and to induce eddy currents at the downstream ends, i.e., 20B, 26B and 30B, of the dividing means.

A particulate-containing fluid stream 34 can be introduced into passage 18 via inlet port Stream 34 passes through passage section 23; subpassages 19A and 19B (as separate substreams 35A and 35B, respectively); passage section 24 as a single stream made of combined substreams 35A and 35B; subpassages 25A and 25B as separate substreams (not shown); passage section 28 as a single stream formed by combining the substreams passing through subpassages 25A and 25B; subpassages 29A and 29B as separate substreams (not shown); and passage section 32 as a single stream formed by combining the substreams passing through subpassages 29A and 29B. The stream exits passage 18 through outlet port 33 as filtered stream 37. As the fluid stream passes through passage 18, eddy currents, e.g., 36 in chamber 21, are formed in the accumulation chambers. These eddy currents cause particulates (not shown) in the passing fluid stream to leave the fluid stream and settle into one or more of the chambers 21, 27 and 31. The chambers become closed off as they fill with particulates, but do not impede or block the flow of the fluid stream through the primary fluid flow passage 18.

The present invention will be described in more detail by way of the following example but it should not be construed to be limited thereto.

EXPERIMENTAL

EXAMPLE

This example illustrates the use of an eddy current-filter within the scope of this invention in a method within the scope of this invention. The filter contains a flow plate and a cover plate, as illustrated in FIG. 2.

The filter contains a single flow plate made of stainless steel and having an area of 25 square inches and a thickness of about 0.10 inch. The flow plate has etched therein a primary fluid passage and forty pairs of accumulation chambers, the primary fluid passage following a zig-zag pattern, such as that shown in FIG. 1. The fluid passage extends from the inlet of the flow plate to the outlet of the flow plate, and has a depth of about 0.05 inch and a transverse width of about 0.10 inch. The filter also contains a transparent cover plate removably attached to the etched surface of the flow plate and having the same dimensions as the flow plate. The cover plate is made of Lexan® polycarbonate. The fluid to be filtered is 100 grams of motor oil (10/30 weight) to which has been added 10 grams of soil fines. One hundred grams of the motor oil is introduced through the inlet of the flow plate and passed through the primary fluid flow passage at a flow rate of about 20 grams per second. As the oil stream passes through the primary fluid flow passage, eddy currents are observed in each of the accumulation chambers. Turbulence within the moving oil stream is also noted. The oil stream reaches the end of the passage about five seconds after it was introduced therein. The stream exits the passage at a flow rate of 50 grams per minute, which is the same flow rate at which the stream was introduced into the passage. The filtered stream's content is measured and found to contain 99% by weight of the motor oil and 1% by weight of the soil fines.

The filter is then cleaned by removing the cover plate from the flow plate and rinsing the flow plate to remove soil fine particles present in the accumulation chambers and oil residues in the primary fluid flow passage and accumulation chambers. After cleaning, the cover plate is reattached to the flow plate and the filter is ready for re-use.

What is claimed is:

1. A filter for filtering particulates from a particulate-containing fluid stream passing through said filter, comprising one or more flow plates, each of said flow plates having (a) one or more primary fluid flow passages, each of said one or more primary fluid flow passages having an inlet and an outlet; and (b) one or more particulates-collecting, eddy current-forming accumulation chambers, each of said accumulation chambers having a particulate-receiving opening, wherein said particulate-receiving opening is disposed in fluid communication with a longitudinal side portion of said one or more primary fluid flow passages, said opening facing a downstream region of said one or more primary fluid flow passages, said downstream region being disposed downstream relative to said longitudinal side portion; each of said one or more accumulation chambers extending away from said longitudinal side portion in a direction which is backward and upstream relative to said longitudinal side portion; said one or more accumulation chambers being disposed to induce formation therein of eddy currents from said fluid stream as said stream passes through said one or more primary fluid flow passages from said inlet to said outlet, said eddy currents causing at least a portion of the particulates in said stream to leave said stream and accumulate in said one or more accumulation chambers; wherein said one or more accumulation chambers are not situated in said one or more primary fluid flow passages and, when said one or more accumulation chambers contain particulates, said one or more particulate-containing accumulation chambers do not impede fluid flow through said one or more primary fluid flow passages; said filter further comprising a cover plate disposed on a surface of said one or more flow plates, said surface comprising said one or more primary fluid flow passages and said one or more accumulation chambers.

2. A filter according to claim 1, wherein said filter comprises one flow plate.

3. A filter according to claim 1, wherein said filter comprises a plurality of said one or more flow plates.

4. A filter according to claim 1, wherein said one or more flow plates comprises one primary fluid flow passage.

5. A filter according to claim 1, wherein said one or more flow plates comprises a plurality of said one or more primary fluid flow passages.

6. A filter according to claim 1, wherein said filter comprises a plurality of said one or more accumulation chambers in fluid communication with said one or more primary fluid flow passages.

7. A filter according to claim 1, wherein at least one of said one or more primary fluid flow passages comprises a first longitudinal side portion and a second longitudinal side portion, and said one or more particulates-collecting, eddy current-forming accumulation chambers are formed in one or both of said first and second longitudinal side portions.

8. A filter according to claim 7, wherein said at least one primary fluid flow passage comprises a plurality of said one or more particulates-collecting, eddy current-forming accumulation chambers.

9. A filter according to claim 8, wherein said plurality of said particulates-collecting, eddy current-forming accumulation chambers are formed only in one of said first and second longitudinal side portions.

10. A filter according to claim 8, wherein said plurality of particulates-collecting, eddy current-forming accumulation chambers are formed in both of said first and second longitudinal side portions.

11. A filter according to claim 10, wherein said plurality of particulates-collecting, eddy current-forming accumulation chambers are provided in pairs on transversely opposite longitudinal side portions of said one or more primary fluid flow passages.

12. A filter according to claim 11, wherein said one or more flow plates comprises at least three of said pairs of said plurality of particulates-collecting, eddy current-forming accumulation chambers.

13. A filter according to claim 1, wherein each of said one or more primary fluid flow passages extends across said one or more flow plates from an inlet of said one or more flow plates to an outlet of said one or more flow plates.

14. A filter according to claim 1, wherein each of said one or more primary fluid flow passages extends in a linear fashion across said one or more flow plates.

15. A filter according to claim 1, wherein each of said one or more primary fluid flow passage extends in a non-linear fashion across said one or more flow plates.

16. A filter according to claim 1, wherein said one or more flow plates each has a thickness of from about 0.001 inch to about 1.0 inch.

17. A filter according to claim 16, wherein said one or more flow plates each has a thickness of from about 0.001 to about 0.25 inch.

18. A filter according to claim 1, wherein said one or more flow plates each comprises a metal selected from the group consisting of stainless steel, aluminum, aluminum-based alloys, nickel, iron, copper, copper-based alloys, mild steel, brass, and titanium.

19. A filter according to claim 1, wherein said one or more flow plates each comprises a non-metal.

20. A filter according to claim 19, wherein said non-metal is selected from the group consisting of plastics, glass, resin-bonded fibrous materials, linoleum, wood, and ceramics.

21. A filter according to claim 1, wherein said one or more primary fluid flow passages and said one or more particulates-collecting, eddy current-forming accumulation chambers have been formed by a micromachining process.

22. A filter according to claim 21, wherein said micromachining process is selected from the group consisting of etching, stamping, punching, pressing, cutting, molding, milling, lithographing, particle blasting, and combinations thereof.

23. A filter according to claim 21, wherein said micromachining process is an etching process.

24. A filter according to claim 1, wherein said cover plate is removable from said surface.

25. A filter according to claim 1, wherein at least one of said primary fluid flow passages is divided by a dividing means having a downstream end and an upstream end, said accumulation chambers being formed in said downstream end of said dividing means.

26. A filter according to claim 25, comprising a plurality of spaced dividing means, each containing an accumulation chamber in said downstream end.

27. A method of filtering particulates from a particulate-containing fluid stream, comprising:

(1) providing a filter comprising one or more flow plates, each of said one or more flow plates having (a) one or more primary fluid flow passages, each of said one or more primary fluid flow passages having an inlet and an outlet; and (b) one or more particulates-collecting, eddy current-forming accumulation chambers, each of said accumulation chambers having a particulate-receiving opening, wherein said particulate-receiving opening is disposed in fluid communication with a longitudinal side portion of said one or more primary fluid flow passages, said opening facing a downstream region of said one or more primary fluid flow passages, said downstream region being disposed downstream relative to said longitudinal side portion; each of said one or more accumulation chambers extending away from said longitudinal side portion in a direction which is backward and upstream relative to said longitudinal side portion; said one or more accumulation chambers being disposed to induce formation therein of eddy currents from said fluid stream as said stream passes through said one or more primary fluid flow passages from said inlet to said outlet, said eddy currents causing at least a portion of the particulates in said stream to leave said stream and accumulate in said one or more accumulation chambers; wherein said one or more accumulation chambers are not situated in said one or more primary fluid flow passages and, when said one or more accumulation chambers contain particulates, said one or more particulate-containing accumulation chambers do not impede fluid flow through said one or more primary fluid flow passages; said filter further comprising a cover plate disposed on a surface of said one or more flow plates, said surface comprising said one or more primary fluid flow passages and said one or more accumulation chambers; and (2) passing said fluid stream through said one or more primary fluid flow passages from said inlet to said outlet such that said eddy currents are formed in said one or more accumulation chambers, thereby causing said portion of said particulates in said fluid stream to leave said fluid stream and to pass through said particulate-receiving opening to enter and accumulate in one or more of said one or more accumulation chambers.

28. A method according to claim 27, wherein said fluid is a liquid.

29. A method according to claim 27, wherein said particulates comprise one or more impurities selected from the group consisting of coagulating agents, flocculating agents, activated carbon, sludge, dirt, ash, colloidal solids, gelatinous solids, and particulates found in wastewaters.

30. A method according to claim 27, wherein the eddy currents move in a backwardly direction from the passing fluid stream.

31. A method according to claim 27, wherein the eddy currents move in a backwardly clockwise or backwardly counterclockwise direction from the passing fluid stream.

32. A method of transferring particulates from a first fluid stream containing said particulates to a second fluid stream, comprising:

(i) providing a filter comprising one or more flow plates, each of said one or more flow plates having (a) one or more primary fluid flow passages, each of said one or more primary fluid flow passages having an inlet and an outlet; and (b) one or more particulates-collecting, eddy current-forming accumulation chambers, each of said accumulation chambers having a particulate-receiving opening, wherein said particulate-receiving opening is disposed in fluid communication with a longitudinal side portion of said one or more primary fluid flow passages, said opening facing a downstream region of said one or more primary fluid flow passages, said downstream region being disposed downstream relative to said longitudinal side portion; each of said one or more accumulation chambers extending away from said longitudinal side portion in a direction which is backward and upstream relative to said longitudinal side portion; said one or more accumulation chambers being disposed to induce formation therein of eddy currents from said fluid stream as said stream passes through said one or more primary fluid flow passages from said inlet to said outlet, said eddy currents causing at least a portion of the particulates in said stream to leave said stream and accumulate in said one or more accumulation chambers; wherein said one or more accumulation chambers are not situated in said one or more primary fluid flow passages and, when said one or more accumulation chambers contain particulates, said one or more particulate-containing accumulation chambers do not impede fluid flow through said one or more primary fluid flow passages; said filter further comprising a cover plate disposed on a surface of said one or more flow plates, said surface comprising said one or more primary fluid flow passages and said one or more accumulation chambers;

(ii) passing said first fluid stream through said one or more primary fluid flow passages from said inlet to said outlet such that said eddy currents are formed in said one or more accumulations chambers, thereby causing said portion of said particulates in said particulate-containing first fluid stream to leave said first fluid stream and pass through said particulate-receiving opening to enter and accumulate in one or more of said one or more accumulation chambers; and (iii) after step (ii), passing said second fluid through said one or more primary fluid flow passages from said outlet to said inlet, wherein at least a portion of said particulates accumulated in said one or more accumulation chambers travels from said one or more accumulation chambers to said second fluid stream.

* * * * *